United States Patent [19]

McAuliffe, Jr.

[11] Patent Number: 4,932,439
[45] Date of Patent: Jun. 12, 1990

[54] SOLENOID ACTUATED THREE-WAY VALVE

[75] Inventor: Lawrence McAuliffe, Jr., Ann Arbor, Mich.

[73] Assignee: Colt Industries Inc., New York, N.Y.

[21] Appl. No.: 398,345

[22] Filed: Aug. 24, 1990

Related U.S. Application Data

[63] Continuation-in-part of Ser. No. 282,587, Dec. 12, 1988, abandoned.

[51] Int. Cl.⁵ .............................................. F15B 13/044
[52] U.S. Cl. .......................... 137/625.65; 251/129.18; 251/129.21
[58] Field of Search .............. 137/625.65; 251/129.18, 251/129.21

[56] References Cited

U.S. PATENT DOCUMENTS

| | | | |
|---|---|---|---|
| 2,267,515 | 12/1944 | Wilcox et al. | 137/625.65 |
| 3,521,854 | 7/1970 | Leiber et al. | 251/129.14 X |
| 3,828,818 | 8/1974 | Hunt | 137/625.65 |
| 4,522,371 | 6/1985 | Fox et al. | 251/129.21 |
| 4,678,006 | 7/1987 | Northman et al. | 137/628.65 X |
| 4,711,265 | 12/1987 | Davis et al. | 137/625.65 X |
| 4,756,331 | 7/1988 | Stegmaier | 137/625.65 X |

Primary Examiner—Gerald A. Michalsky
Attorney, Agent, or Firm—Walter Potoroka, Sr.

[57] ABSTRACT

A solenoid actuated three-way valve is formed with a central passage communicating at one end with a vent passage via a first valve seat and communicating at its opposite end with a pressure supply port via a second valve seat. A control port directly communicates with the central passage at all times. An armature is slidable within the passsage to block one of the valve seats while opening the other and is resiliently biased toward one seat by a compression spring and magnetically biased toward the other seat by energization of the solenoid coil. Flux washers at opposite ends of the coil contact a ferromagnetic casing to provide an efficient flux path enabling rapid response of the armature to coil energization. One valve seat is loccated at one end of a pole piece threadably adjustable within one of the flux washers to establish a working gap in the magnetic circuit of a minimum width of the valve. A relatively large return gap is provided to minimize frictional losses within the valve.

6 Claims, 1 Drawing Sheet

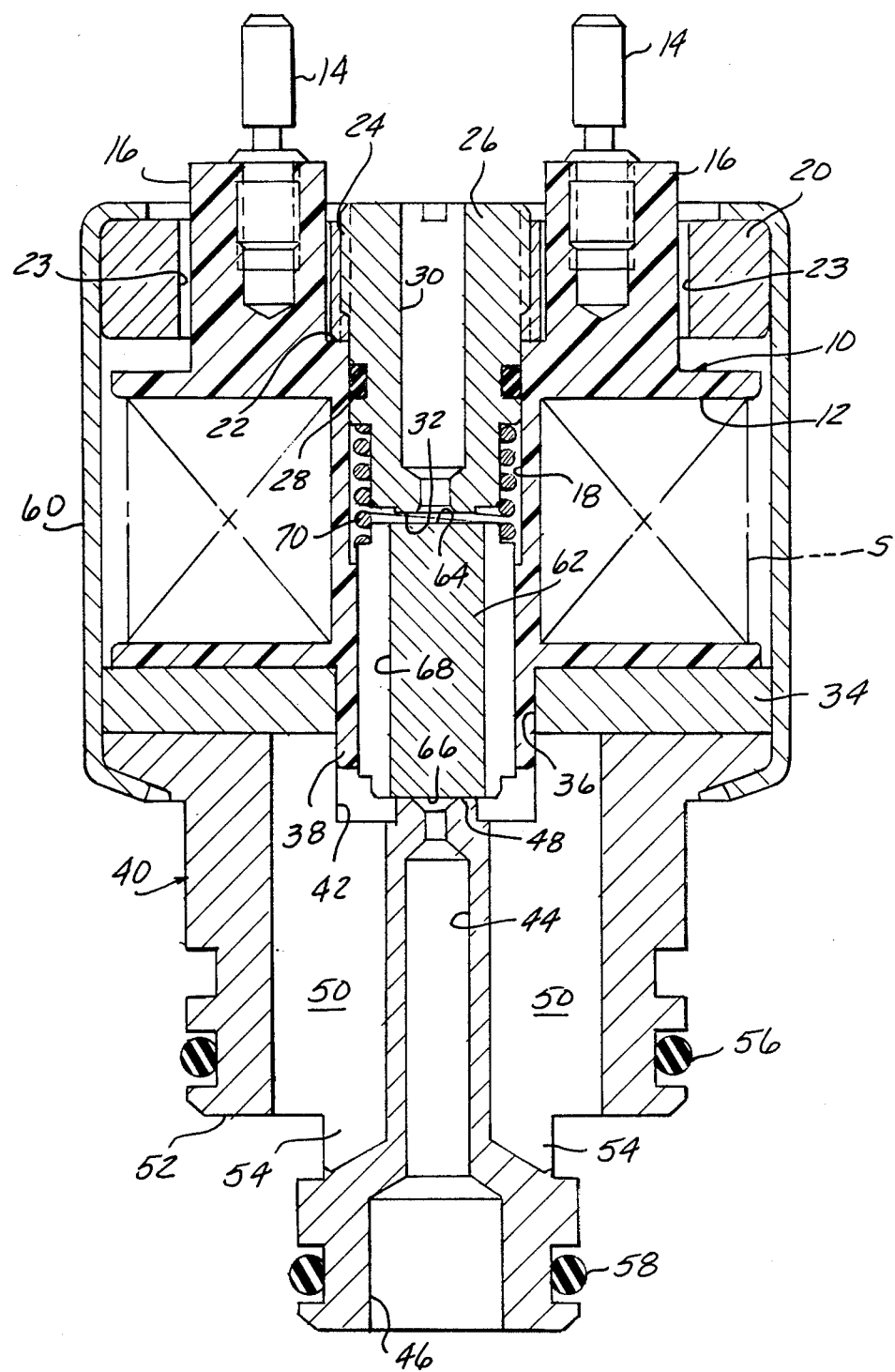

SOLENOID ACTUATED THREE-WAY VALVE

CROSS-REFERENCE TO RELATED APPLICATION

This application is a continuation-in-part of my copending application Ser. No. 07/282,587, filed Dec. 12, 1988, now abandoned.

BACKGROUND OF THE INVENTION

I. Field of the Invention

The present invention is directed to a solenoid actuated three-way valve of the type employed in pulse width modulated pressure control systems wherein the pressure at a control port of the valve is regulated by cyclically connecting the control port alternately to a high-pressure source and a low-pressure source to achieve a pressure at the control port proportional to the percentage of time during which the control port is connected to the high-pressure port.

II. Description of the Related Art

Valves of the foregoing type are being increasingly employed to control automotive transmission systems by regulating the engagement pressure of various clutches within the transmission to regulate the torque transmitted through the individual clutch. An on-board microprocessor receives various inputs representative of vehicle operating conditions, such as vehicle speed, engine RPM, throttle setting, etc. The processor is programmed to compute the optimum transmission ratio in accordance with the various inputs. In response to the inputs, the processor generates a pulse width modulated control signal at a constant frequency, typically in the order of 60 Hz, which controls energization of the solenoids of the various solenoid valves. During each cycle of the pulse width modulated control signal, the coil of a solenoid actuated valve is energized for a predetermined percentage of the cycle period and deenergized for the remainder of the cycle. Over a series of successive cycles, the pressure at the control port of the valve, assuming the pressure at the low-pressure port is zero, will be a percentage of the pressure at the high-pressure port equal to the percentage of time the high-pressure port is connected to the control port.

The requirements of a solenoid valve employed in such a system are basically that shifting of the valve armature between its alternate positions must closely and accurately track the rapidly repeated energization and deenergization of the solenoid coil. This requires the development of a maximum axial force applied to the solenoid armature upon energization of the coil, and minimum parasitic losses, such as friction, eddy currents, etc. within the assembly.

The present invention is directed to a solenoid valve which efficiently meets these last requirements, as well as the universal requirement of the automotive industry of low unit cost and simplified construction.

SUMMARY OF THE INVENTION

A solenoid valve embodying the present invention includes a one-piece bobbin of a molded, non-magnetic material formed with a central passage extending axially through the bobbin. At one end of the bobbin, a pair of projecting posts are integrally formed to serve as mounts for electrical connectors to be connected to the opposite ends of the winding of the solenoid coil which is would upon the bobbin. Annular flux washers are mounted on the bobbin adjacent each end of the bobbin, one of the flux washers having a pair of bores for passing the connector mounting posts on the bobbin and a central threaded bore into which a pole piece is adjustably threaded with the inner end of the pole piece blocking one end if the central passage through the bobbin. The pole piece is formed with an axial passage which extends from a valve seat at the end disclosed within the central passage to a vent port opening to atmosphere. The other flux washer is sandwiched between the opposite end of the bobbin and a valve housing with its inner periphery at a fairly substantial radial spacing outwardly from their central passage. The valve housing has a chamber communicating with the central passage in the bobbin. This chamber is at all times in communication with a control port via a passage in the valve housing. A supply port in the valve housing communicates via a supply passage in the housing with a valve seat opening into the chamber in coaxial alignment with the central passage. An armature is slidably received within the central passage between the two valve seats and is axially movable within the passage between end limits defined by the engagement of the armature with one or the other of the two valve seats. The armature is grooved along its outer surface to provide a substantially unrestricted flow passage between the opposite ends of the armature while enabling the armature to slidably engage the central passage wall to maintain the armature accurately centered within the passage.

In a preferred form of the invention, a compression spring is engaged between the pole piece and armature to bias the armature to seal the valve port which communicates with the supply port, the string bias exceeding the pressure exerted on the armature by pressure at the supply port. In this arrangement, the control port is thus normally in direct fluid communication with the vent port. When the solenoid is energized, the armature is magnetically shifted to unseat the armature from the valve seat connected to the supply port and to simultaneously seal the valve port in communication with the vent passage, the magnetic force of the energized coil being augmented by the supply port pressure. In this energized condition of the solenoid, the control port is connected to the supply port.

The flux washers, bobbin and valve housing are held in assembled relationship with each other by a sheet metal housing which axially clamps the parts into assembled relationship with each other and also serves as a portion of the path for the magnetic flux to increase the efficiency of the magnetic shifting of the armature. A relatively short axial air gap between the pole piece and armature maximizes the magnetic shifting force which a relatively large radial air gap between the opposite end of the armature and flux washer minimizes friction producing radial forces on the armature.

Other objects and features of the invention will become apparent by reference to the following specification and to the drawing.

BRIEF DESCRIPTION OF THE DRAWING

The single figure of drawings shows a cross-sectional view, taken on an axial plane, of a three-way solenoid actuated valve embodying the present invention.

DESCRIPTION OF THE PREFERRED EMBODIMENT

The valve shown in the drawing includes a solenoid bobbin designated generally 10 which may be conveniently molded from any of several suitable non-magnetic, thermoplastic materials. The bobbin is formed with an annular recess 12 in which the solenoid coil S is wound and the ends of the wire of the coil are led through bores in the bobbin (not shown) to electrical connectors 14 fixedly mounted in a pair of axial projections 16 formed at one end of the bobbin.

The bobbin is also formed with a central passage 18 which extends axially entirely through the bobbin.

At the upper end of bobbin 10, an annular flux washer 20 of ferromagnetic material is seated upon a shoulder 22 formed on bobbin 10. Flux washer 20 is formed with a pair of bores 23 located to loosely receive connector projections 16. A central bore 24 through washer 20 is coaxially aligned with central passage 18 of the bobbin and is internally threaded to threadably receive a pole piece 26 which is likewise formed of a ferromagnetic material.

The lower end of pole piece 26 projects into the upper end of central passage 18 and is sealed to the inner wall of passage 18 as by an O-ring 28 which will accommodate axial adjustment of the pole piece relative to flux washer 20 for purposes referred to below. A passage 30 extends axially through pole piece 26 to open at its lower end into central passage 18 via an annular valve seat 32 formed on the lower end of the pole piece. In the particular embodiment shown in the drawing, passage 30 opens at its upper end to atmosphere and passage 30 constitutes a vent passage.

For reasons to be discussed below, pole piece 26 is threadably adjustable in washer 20 axially of passage 18 to establish an accurately determined working gap or axial spacing between the upper end of the solenoid armature 62 and valve seat 32 when the armature is in the position shown in the drawings.

A second flux washer 34 is mounted at the lower end of bobbin 10 and formed with a central bore 36 received upon a reduced diameter axial extension 38 formed on the lower end of the bobbin. For reasons to be discussed below, the internal diameter of bore 36 is between 110% and 140% of the diameter of passage 18 in the bobbin.

Underlying flux washer 34 is a valve housing designated generally 40. Housing 40 is formed with a central recess 42 extending downwardly from its upper end which is dimensioned to slidably receive the lower end of projection 38 of the bobbin A central bore 44 extends upwardly through housing 40 from a supply port 46 located at the lower end of housing 40. Passage 44 opens into chamber 42 via a valve seat 48 located at the bottom of recess 42. At diametrically opposite sides of passage 44, a pair of bores 50 extend downwardly through valve housing 40 from its upper end to open through an undercut shoulder 52 on housing 40 through control ports 54. Valve housing 40 is conformed to be axially inserted into a manifold, not shown, and sealed to the manifold as by O-rings 56, 58.

Valve housing 40, bobbin 10 and flux washers 20 and 34 are fixedly secured in the assembled relationship shown in the drawing by a sheet metal casing 60 which firmly clamps these parts in axial, face-to-face relationship with each other. Casing 60 is of a ferromagnetic material and also functions as a part of the flux path of the magnetic flux induced by energization of solenoid coil S.

Within central passage 18, an armature 62 is slidably mounted for axial movement within passage 18 between valve seats 32 and 48. For reasons to be discussed below, the outer diameter of armature 62 is such as to establishing a close, but freely sliding fit within passage 18. The axial length of armature 62 is less than the spacing between the two valve seats (as adjusted by threadably positioning pole piece 26 in flux washer 20) so that when one of the heads 64, 66 is seated, sealed engagement with its valve seat, the other valve head is disengaged from its associated seat by a distance sufficient to accommodate an adequate flow of fluid between the head and seat. Axial grooves 68 in the outer surface of armature 62 provide a substantially unrestricted flow path between the opposite ends of the armature to equalize fluid pressure at opposite ends of the armature.

Spring 70 resiliently biases the armature 62 downwardly as viewed is the drawing to place valve head 66 in seated engagement upon valve seat 48, there by blocking fluid communication between supply port 46 and chamber 42. Control ports 64 are in fluid communication at all times with the chamber 42 via bores 50. With armature 62 in the position shown in the drawing, chamber 42 is in fluid communication with vent passage 30 via valve seat 32 and grooves 68 in armature 62.

Electrical energization of solenoid coil S is operable to generate a magnetic flux which magnetically biases armature 62 upwardly from the position shown in the drawing until the valve head 64 at the upper end of armature 62 contacts valve seat 32. With valve seat 32 closed by valve head 64, communication between vent passage 30 and control ports 54 is blocked, but at the same time valve head 66 has been lifted upwardly out of engagement with valve seat 48 so that supply port 46 (connected to a source of air under pressure, not shown) is in fluid communication with control port 54 via passage 44, valve seat 48 and bores 50.

The valve is especially intended for use in a system in which solenoid coil S is cyclically energized and deenergized under the control of a pulse width modulated control signal. In a general application, where air is used as the pressure fluid, supply port 46 will be connected to a source of air under pressure and control ports 54 will be connected to the actuating chamber of a pneumatically actuated device, while passage 30 will be simply vented to atmosphere. The pulse width modulated control signal which controls energization of solenoid coil S cyclically energizes and deenergizes the solenoid coil so that the period of time within a given cycle during which coil S is energized is varied in accordance with variations of the control signal derived from a microprocessor. As explained above, the microprocessor will receive inputs representing various operating parameters and generate a control signal output in accordance with the processor program.

As explained above, when the solenoid is deenergized and the armature 62 is in the position shown in the drawing, control ports 54 and any controlled device connected to it will be vented to atmosphere via pores 50, chamber 42, grooves 68 in armature 62 and vent passage 30. Pressure from the supply source at supply port 46 is isolated from control port 54 at this time because valve head 66 of the armature is seated upon valve seat 48.

Upon energization of solenoid coil S, armature 62 is magnetically biased upwardly to disengage valve head 66 from valve seat 48, thereby placing supply port 46 in communication with control port 54 to supply pressure from the pressure source to the control device. Simultaneously, valve head 64 engages valve seat 32 to isolate vent passage 30 from the control and supply ports 54, 46.

When armature 62 is rapidly and continually cycled between its two positions, control port 54 is alternately connected to vent passage 30 and to supply port 46. When control port 54 is connected to the supply port 46, the pressure at control port 54 will tend to increase to approach the pressure of the source connected to supply port 46, while when control port 54 is connected to vent via passage 30, the pressure at control port 54 will tend to drop toward zero or atmospheric pressure. By continuously applying alternate on-off cycles, the pressure at port 54 will stabilize at a pressure which is a percentage of the supply source pressure equal to the percentage of time over the given time period during which the solenoid coil was energized.

Typical operating frequencies of a pulse width modulating control system are in the neighborhood of 60 Hz, which means that the armature 62 must be capable of rapid movement between its alternate positions. Movement of armature 62 to the normal (solenoid deenergized) position shown in the drawing is essentially under the control of spring 70 and presents no substantial design problems. Movement of the armature to its upper position as viewed in the drawings depends upon the magnetic flux developed by energization of the solenoid, and in particular the axial flow of the magnetic flux across what will be referred to as the working gap which is the axially spacing between valve head 64 and the opposed valve seat 32. The development of a maximum axially directed magnetic force upon armature 62 for a given number of ampere turns of solenoid coil S requires a consideration of several design parameters.

In addition to acting as a return spring, spring 70 also functions as a pressure relief setting in the event the pressure at supply port 46 should, for some reason or other, increase above a desired value.

In the valve configuration described above, the magnetic circuit or flow path of magnetic flux induced by energization of solenoid S has two "air gaps", one of which is the working gap referred to above — i.e. the axial spacing between valve head 64 at the top of the armature and the opposed valve seat 32 on the pole piece. The second "air gap" is that between the wall of bore 36 in the lower flux washer 34 and the outer diameter of armature 62.

The flow of flux across the working gap between valve head 64 and its associated valve seat 32 is directed axially of the coil and it is the magnetic force developed across this gap which acts to shift armature 62 upwardly against the action of spring 70 to seat valve head 64 against seat 32. Because the magnetic force developed across the working gap varies inversely with the square of the distance across the gap, obviously rapid response of the valve dictates this distance be as small as possible. The minimum distance or working gap length is established by the minimum fluid flow requirements of the valve — in other words, there must be enough space left between valve head 64 and valve seat 32 when in the position shown in the drawing to accommodate adequate fluid flow through the opened valve 64, 32. This spacing, due to manufacturing tolerences and variations in material characteristics is difficult to calculate, hence the threaded adjustment of pole piece 26 permits the working gap to be adjusted after assembly.

Flow of flux across the return gap between the surface of bore 36 in the lower flux washer and the outer diameter of armature 62 is essentially flow along paths extending radially of the longitudinal axis of the armature. This radially directed flow of flux has substantially no direct effect upon axial movement of armature 62 beyond the fact that the power required to generate the flow of flux across the return gap is not available to assist in driving the armature is axial movement. Thus, it is generally considered by the prior art to be good design practice to make the return gap or radial clearance between the armature and bore 36 as small as possible to minimize the power loss within the magnetic circuit. This reasoning, however, overlooks an important fact which has been ignored in the prior art.

It is generally assumed that because the inner wall of bore 36 and the outer surface of armature 62 are circular and coaxial with each other, the magnetic forces induced by the flow of magnetic flux radially across the return gap counterbalance each other and inherently result in an equilibrium condition in which there is no not force tending to move the armature in any radial direction. While this assumption is theoretically correct, this theoretical equilibrium of forces is based on an overly optimistic assumption that the opposed bore and armature surfaces are precisely circular and precisely coaxial with each other and that the magnetic field is precisely symmetrical. In theory, such equilibrium is possible, in practice it cannot be achieved in devices produced on a mass production basis.

If this magnetic equilibrium is not achieved, a net force will be applied biassing the armature in a direction radially of its axis and this force will increase with the resultant movement of the armature. The armature will move radially until it is prevented from moving further by engagement with the wall of passage 18. This will result in frictional forces between the armature and passage wall which are generally proportional to the force which presses the armature against the wall. Where the return gap is minimized in accordance with conventional design practice, the forces urging the armature against the passage wall will be relatively high, and the resultant frictional forces can typically absorb 20% or more of the power required to axially shift the armature by energization of the solenoid coil. Power losses of this magnitude can equal or exceed any gain achieved by minimizing the return gap.

Thus, in accordance with the present invention a relatively wide return gap is employed by making the internal diameter of bore 36 a diameter which is somewhere within the range of 110% to 140% of the outside diameter of the armature which, desirably is made as closely fitting as possible to the internal diameter of passage 18 as is compatible with a freely sliding fit.

The magnetic reluctance of the return gap, where the gap is relatively large, as described above, may be reduced by increasing the area of the return gap — i.e. increasing the axial thickness of flux washer 34. As a rough rule of thumb, for a fast responding solenoid valve of the type under consideration the thickness of the flux return washer 34 should be between 30 and 50 percent of the axial length of solenoid coil S.

Because the unbalanced magnetic force across the return gap which induces radial movement of the armature increases rapidly as the armature moves in response to this force, the normal radial clearance between the outer diameter of the armature and the wall of passage 18 should be made as small as possible to minimize this movement, while at the same time allowing the armature to slide freely through the passage. The axial grooves 68 in the armature enable a major portion of the armature surface to slidably contact the passage wall, while at the same time providing an adequate flow path for the working fluid to flow through passage 18 from one end of the armature to the other.

The ratio of the mechanical radial clearance between the armature and wall of passage 18 to the magnetic clearance (return gap) between the outer wall of the armature and bore 36 in flux washer 34 has a substantial effect on the frictional forces discussed above. The ratio of the mechanical clearance to the magnetic clearance should be as low as possible and should not exceed 0.2.

Selection of the material from which the armature, flux washers pole piece 26 and casing 60 are constructed depends on the particular application of the valve, taking into account cost considerations.

Where cost considerations are paramount, as is frequently the case in automotive applications, the material having the standard designation 12L14 (a medium carbon leaded steel) is a preferred material. In addition to its low material cost, 12L14 is easily machined, a consideration where parts of complex state, such as the slotted armature 62 and upper flux washer 20, are involved.

However, most automotive applications require the valve to operate at temperatures well below freezing where higher forces are required to overcome the viscosity of a cold working fluid controlled by the valve. For low temperature operation, a 2.5% silicon iron is preferred; however, this material is more costly than 12L14 and more difficult to machine.

Where parts of complex shape are employed, a powdered metal of 0.45% to 0.9% phosphorus iron alloy may be the preferred material because it may be pressed and sintered to form parts of complex shape at a relatively low manufacturing cost and has somewhat better performance characteristics than 12L14.

While one embodiment of the invention has been described in detail, it will be apparent to those skilled in the art the disclosed embodiment may be modified. Therefore, the foregoing description is to be considered exemplary rather than limiting, and the true scope of the invention is that defined in the following claims.

What is claimed is:

1. In a solenoid actuated three way valve intended for rapidly repeated cyclic operation, said valve comprising an energizable solenoid coil, an elongate armature mounted within a main passage extending coaxially through said coil and having first and second valve head means respectively located at its opposite ends, first and second valve seat means at the respective opposite ends of said main passage, said first and second seat means be spaced from each other axially of said main passage by a distance greater than the length of said armature, means defining first and second flow passages opening into said main passage through the respective first and second valve seats, spring means biasing said armature in one direction to normally maintain said first valve head means engaged with said first valve seat to block fluid communication between said main passage and said first passage, said solenoid coil being operable when energized to magnetically bias said arpature in the opposite direction to engage said second valve head means with said second valve seat to block fluid communication between said main passage and said second passage, and means defining a third flow passage opening into said main passage, the improvement wherein said valve includes first and second annular flux washers located at the respective opposite ends of said coil, a hollow generally cylindrical metal outer housing member externally surrounding said coil and contacting the outer periphery of said first and second flux washers to define a low reluctance magnetic flux path therebetween, said first valve seat being located axially beyond that side of said first flux washer remote from said coil, a pole piece mounted upon said second flux washer and projecting from said second flux washer into said passage beyond the adjacent end of said coil, said second valve seat being located on said pole piece and said pole piece being adjustable axially of said main passage to adjustably establish a minimum working gap adequate to accomodate fluid flow between said second valve seat and said second valve head means when said solenoid coil is deenergized, said first flux washer having a central bore therethrough coaxial of said main passage and of a diameter falling within the range of 110% and 140% of the diameter of said main passage.

2. The invention defined in claim 1 wherein said main passage is defined at least in part by a central bore extending through a solenoid coil supporting bobbin of non magnetic material, said armature being of an outer diameter such that the armature is slidably received within said central bore, with a minimum clearance, the outer diameter of said armature being between 15 and 30% of the outer diameter of said coil.

3. The invention defined in claim 1 wherein the axial thickness of said first flux washer is between 30 and 50 percent of the axial length of said coil.

4. The invention defined in claim 1 wherein said armature is slidably received within said main passage with a radial clearance $R_1$ from the wall of said main passage, and the radial clearance $R_2$ between said armature and said central bore of said first flux washer is such that $R_1/R_2$ is less than 0.2.

5. The invention defined in claim 4 wherein said armature includes means defining fluid flow grooves in the outer surface of said armature extending axially from one end of said armature to the other.

6. The invention defined in claim 1 wherein said armature, flux washers and outer housing member are of a material selected from the group consisting of:
 a. 2.5% silicon iron
 b. 12L14
 c. 0.45% to 0.9% phosphorus iron.

* * * * *